United States Patent [19]

Ferrence

[11] Patent Number: 5,131,713

[45] Date of Patent: Jul. 21, 1992

[54] VEHICLE FOR A FREIGHT TRANSPORTATION SYSTEM

[75] Inventor: David N. Ferrence, Kingston, Canada

[73] Assignee: UTDC, Inc., Kingston, Canada

[21] Appl. No.: 726,125

[22] Filed: Jul. 3, 1991

Related U.S. Application Data

[60] Continuation of Ser. No. 610,763, Nov. 8, 1990, abandoned, which is a division of Ser. No. 516,965, Apr. 30, 1990, Pat. No. 5,015,141, which is a continuation of Ser. No. 263,445, Oct. 27, 1988, abandoned.

[51] Int. Cl.$^5$ ............................................. B60J 7/08
[52] U.S. Cl. .................................... 296/100; 296/181; 105/378
[58] Field of Search ............... 414/390, 395, 396, 400, 414/389; 296/100, 181, 183; 280/79.2; 49/36; 105/378; D12/96, 102

[56] References Cited

U.S. PATENT DOCUMENTS

| D. 193,387 | 8/1962 | Phillips, Jr. | D12/102 |
|---|---|---|---|
| D. 276,326 | 11/1984 | Bell, Jr. | D12/96 |
| 935,754 | 10/1909 | Gorby | 296/100 X |
| 4,221,536 | 9/1980 | McFee | 410/6 X |
| 4,249,852 | 2/1981 | Alstad | 296/101 X |
| 4,682,811 | 7/1987 | Ooguro | 296/181 |

FOREIGN PATENT DOCUMENTS

| 1808429 | 8/1969 | Fed. Rep. of Germany | 414/395 |
|---|---|---|---|
| 2532896 | 3/1984 | France | 296/181 |
| 54-2496 | of 1979 | Japan | 296/183 |
| 59-84623 | 5/1984 | Japan | 296/100 |
| 59-171715 | 9/1984 | Japan | 296/100 |
| 62-15176 | 1/1987 | Japan | 296/183 |
| 63-247115 | 10/1988 | Japan | 296/181 |
| 663056 | 11/1987 | Switzerland | 296/183 |
| 2152448 | 8/1985 | United Kingdom | 296/181 |

OTHER PUBLICATIONS

Transport World, Feb. 1964, p. 21, "Trailing along".

*Primary Examiner*—Robert J. Spar
*Assistant Examiner*—Robert S. Katz
*Attorney, Agent, or Firm*—Fleit, Jacobson, Cohn, Price, Holman & Stern

[57] ABSTRACT

A vehicle for a freight transportation system has a platform with end walls located at opposite ends. A pair of doors are pivotally connected to the end walls and are pivotal upwardly between closed and open positions. The doors are held in the closed position by a latch that includes a release member projecting laterally from the door. Upward movement of the release member releases the latch and allows the doors to be moved to the open position.

7 Claims, 7 Drawing Sheets

VEHICLE FOR A FREIGHT TRANSPORTATION SYSTEM

This application is a continuation of application Ser. No. 07/610,763, filed Nov. 8, 1990, now abandoned which is a divisional application of application Ser. No. 07/516,965, filed Apr. 30, 1990, now U.S. Pat. No. 5,015,141, granted May 14, 1991, which is a continuation of Ser. No. 07/263,445, filed Oct. 27, 1988, now abandoned.

The present invention relates to freight transportation systems and more particular to arrangements for facilitating the unloading of freight.

Arrangements for transporting freight are well known in the art. For long distance freight transportation, large rail cars or trucks are utilized which are unloaded with specialized equipment such as fork lift trucks. The time taken to unload the freight is small compared with the transportation time and therefore is not of primary concern. There is however a need for transportation systems which convey freight over a relatively short distance and in which the time taken to unload is a significant part of the overall handling time. An example of such an application is in airports when baggage must be transported between terminals. Conveyor belt systems have been typically used to avoid unloading but the speed at which the baggage is transported is slow and the conveyor belt systems are prone to failure. Other baggage handling arrangements have been considered which use gas powered carts for transporting baggage. However, problems exist in these arrangements in that the manpower required to remove the baggage from the carts once the baggage has been transported, is expensive.

It is therefore an object of the present invention to obviate or mitigate the above disadvantages by providing a novel freight transport system.

According to one aspect of the present invention there is provided a freight transportation system comprising a loading station, an unloading station and a vehicle movable therebetween to transport freight, said vehicle including a support platform to carry said freight and retaining means on the platform, said retaining means being movable from a first position in which removal of freight is inhibited and a second position in which removal of freight is permitted, said unloading station including opening means operable on said retaining means to move it between said first and second positions upon arrival of the vehicle at said unloading station and freight discharge means operable to discharge freight from the platform to one side of said vehicle.

In another aspect of the present invention there is provided a freight transportation system comprising a loading station, an unloading station and a vehicle moveable therebetween, said vehicle including a support platform to carry freight and a pair of doors located on opposite sides of the said vehicle, said doors being moveable from a first position in which removal of freight is inhibited to a second position in which removal of freight is permitted, said unloading station including opening means operable upon said doors when said vehicle is stationary to move said doors concurrently to said second position to permit removal of said freight.

In another aspect of the present invention there is provided a freight transportation vehicle comprising a platform, a door located on opposite sides of said platform and each movable from a first position in which they inhibit removal of freight from said platform to a second position in which they permit removal of freight from said platform, said doors being pivotally mounted above their upper edge to cause movement laterally away from said platform upon movement from said first position to said second position.

In still yet another aspect of the present invention there is provided a freight discharge apparatus comprising a base, a boom mounted on said base and drive means operable to cause said boom to move across a planer surface and discharge freight therefrom.

An embodiment of the present invention will now be described by way of example only with reference to the accompanying drawings in which.

Figure 1:
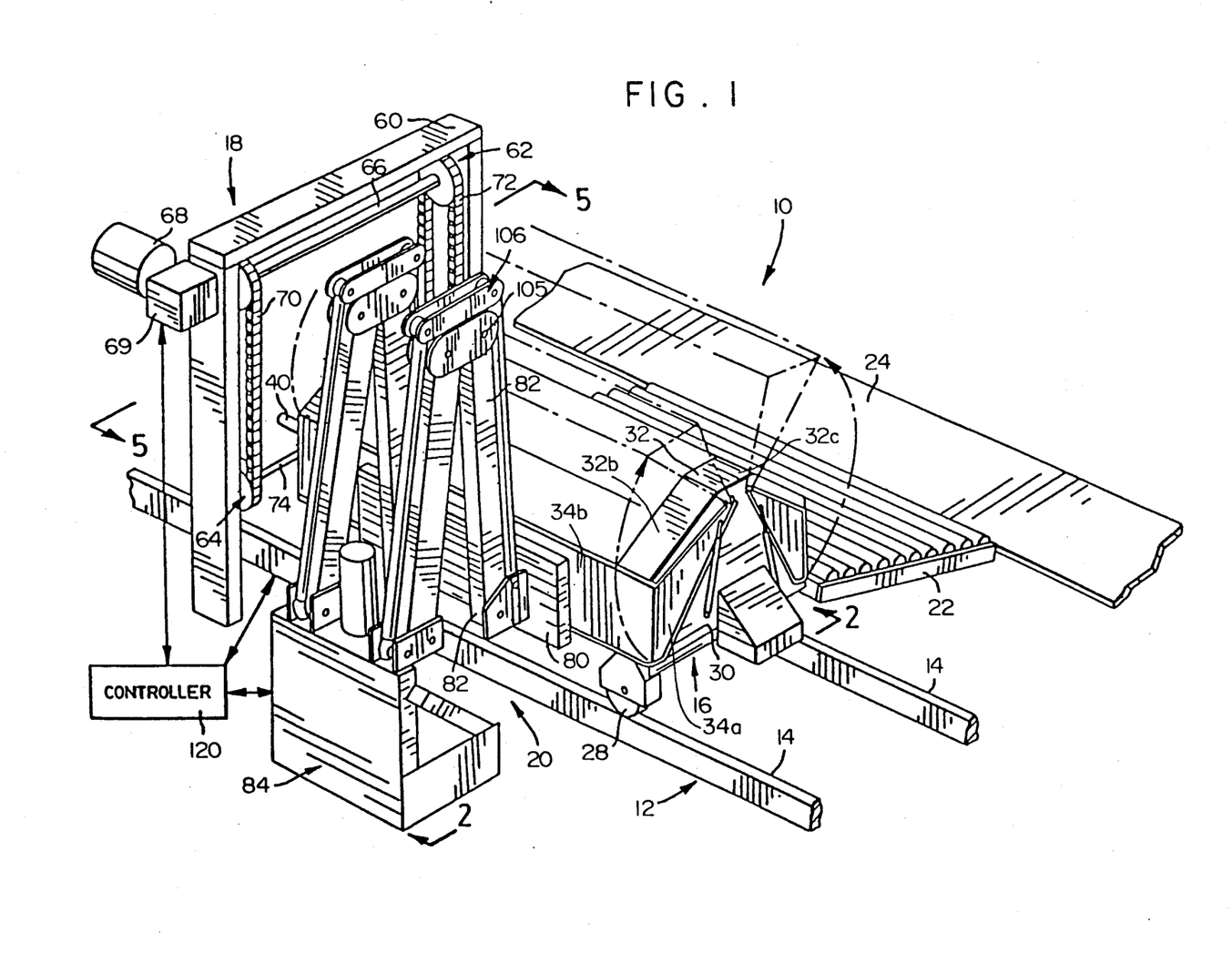
FIG. 1 is a perspective view of a freight transportation system.

Referring to FIG. 1, a freight transportation system in the form of a baggage transport and removal system is generally shown at reference numeral 10. The system 10 includes a track 12 having a pair of rails 14 for supporting a wheeled baggage cart 16 powered by in track linear induction motors (LIM's) (not shown). A door opening mechanism 18 straddles the track 12 and opens the doors of the baggage cart 16 when the cart is in the unloading station. A baggage removing device 20 is positioned on one side of the track 12 for removing the baggage from the cart 16. A roller set 22 is positioned on the other side of the track 12 and receives the baggage after it has been pushed off of the cart 16. A conveyor belt or carousel 24 receives the baggage from the roller set 22 and transports the baggage at a reduced speed to its desired location.

Figure 5:
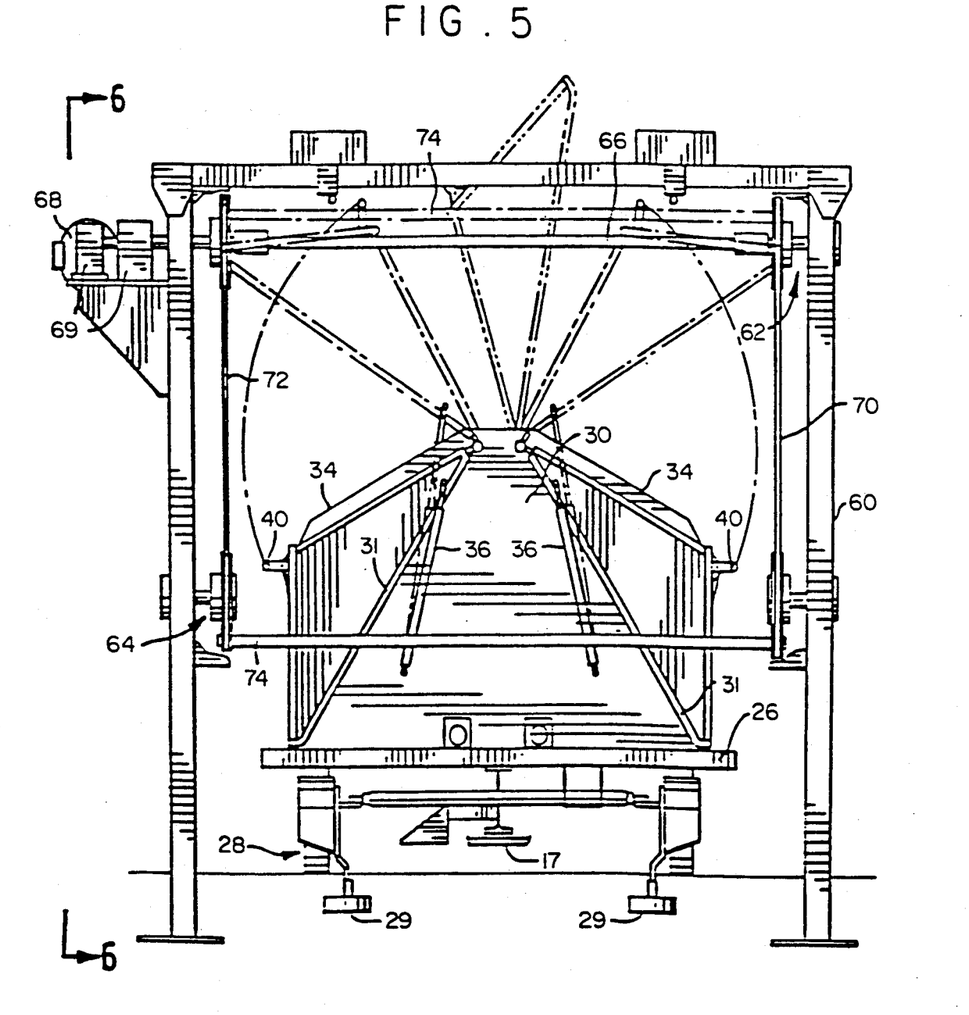
FIG. 5 is a rear view of the system illustrated in FIG. 1 taken along line 5—5.
Figure 6:
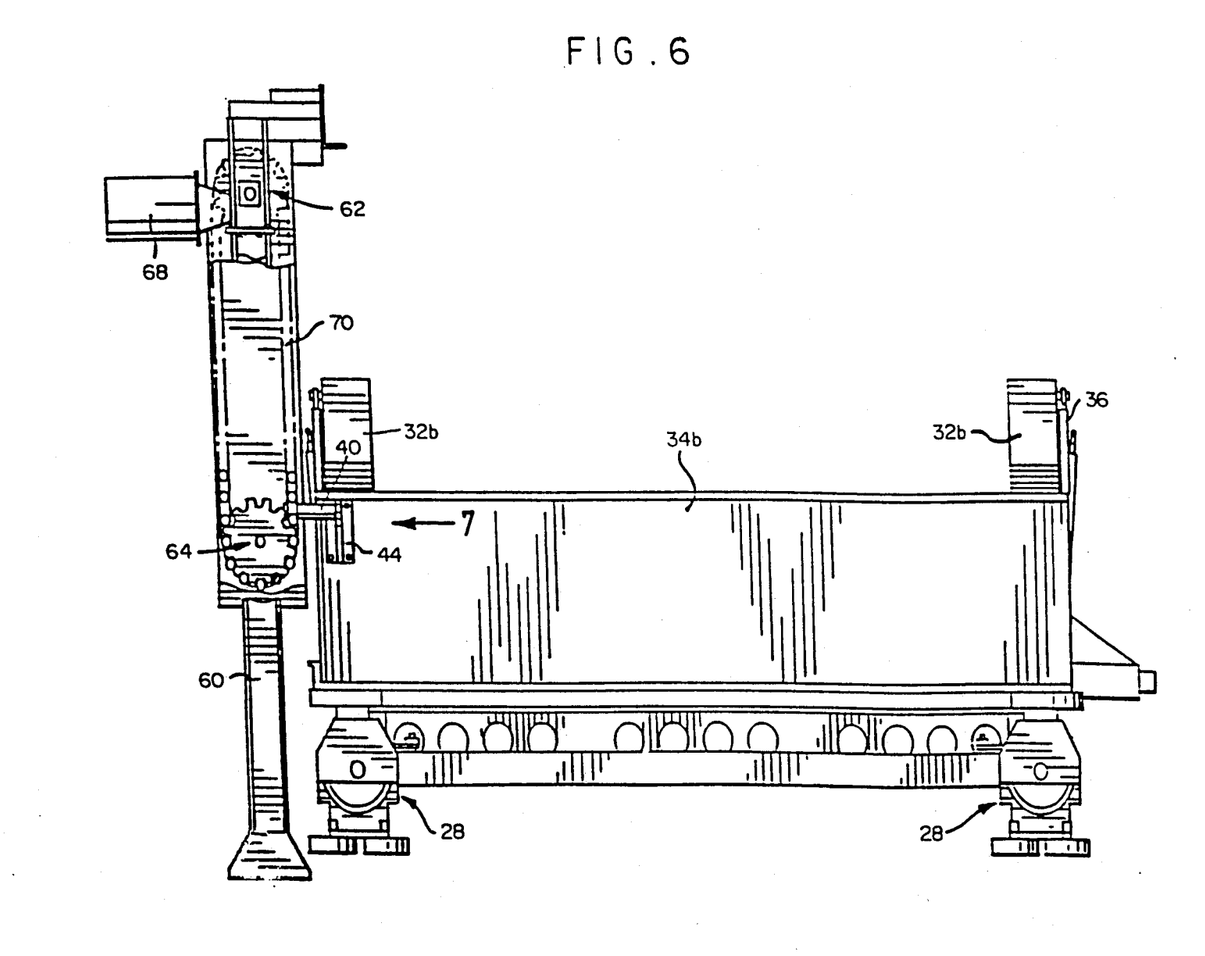
FIG. 6 is a partial sectional view of the system illustrated in FIG. 5 taken along line 6—6.

Referring now to FIGS. 1, 2, 5 and 6, the cart 16 is better illustrated. As can be seen, the cart comprises a support platform 26 for supporting baggage and two axle sets 28. The cart 16 includes a reaction rail 17 secured to the undercarriage of the cart which extends along the longitudinal axis of the cart. Linear Induction Motors primaries (not shown) are located between the rails of the track 12 at spaced intervals for energizing the reaction rail 17 to provide thrust for the cart 16. Guide wheels 29 project forwardly from the leading axle 28 to cooperate with the track 12 and steer the axle sets along the track as shown in FIG. 5.

End walls 30 extend upwardly from either end of the platform and have inclined upper edges 31. Side frames 32 extend from each end wall 30 to provide support therefor and include sidewall elements 32a, beam elements 32b and a roof element 32c spanning the beam elements 32b. A pair of gull-winged doors 34 are provided on the cart 16 with each door being located on opposite sides of the cart. Since the doors 34 are identical only one will be described herein. The door 34 includes two longitudinally spaced end wall portions 34a which overly respective ones of the end walls 30. The diverging end of the end wall portions 34a are connected to opposite ends of a side wall member 34b extending the length of the cart 16. The other converging end of the end wall portions 34a are pivotally connected to the respective end wall 30 adjacent the upper portion thereof via a pin to define a hinge. Thus, when the doors 34 are in the closed position as shown in FIG. 1, the side wall members 34b define side walls for the cart and constitute retaining means for inhibiting removal of baggage stored thereon. The doors 34 may be swung upwardly about their hinges to an open position as shown in chain dot lines in FIGS. 2 and 5 to allow access to and egress from platform 26. Air springs 36 are connected between the end walls 30 and the end wall portions 3a of the doors 34 and provide vertical forces to counterbalance the weight of the doors 34 so that they fall in a controlled manner under the influence of gravity to the closed position. The air springs 36 also limit the upward pivoting movement of the doors 34 by the available extent of their travel.

The air springs 36 are located to allow a stable open position for the doors 34 if they are operated manually. In this manner, the person unloading the cart does not have to hold the doors open when unloading the cart 16 once they have been lifted to this position. The air springs 36 allow the doors 34 to move "overcentre" so that their centre of gravity is inboard of the hinge point with the air springs 36 limiting further pivotal movement. To close the doors, the person merely has to push downwardly on the doors until the centre of gravity of the doors 34 moves back outboard of the hinges when the air springs 36 will again counterbalance the door.

Figure 7:
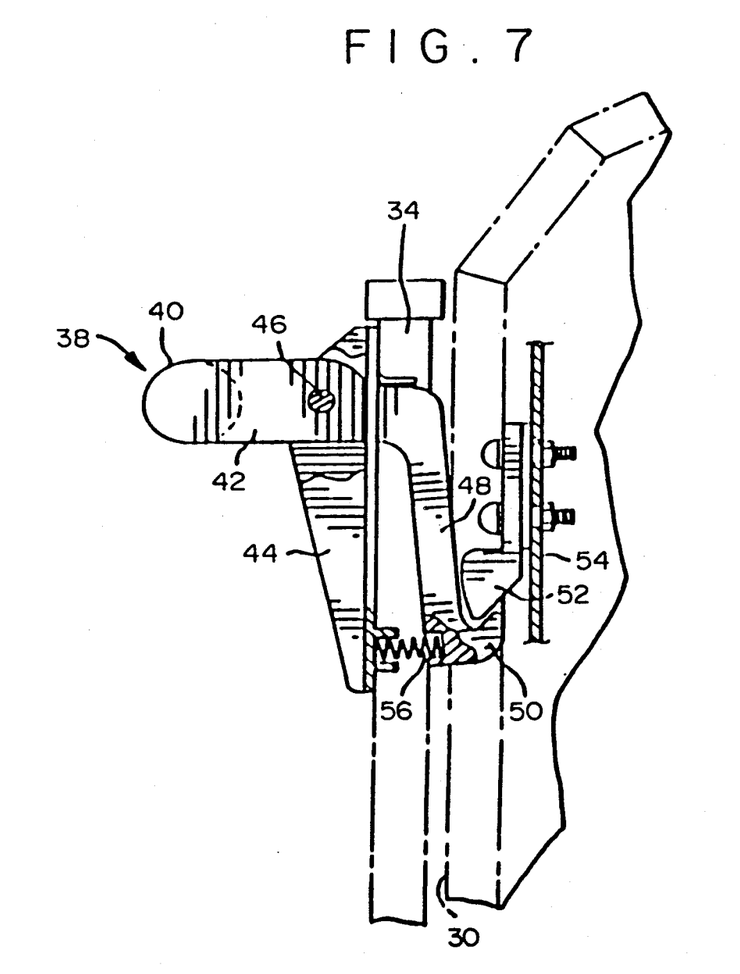
FIG. 7 is a sectional view of a portion of the system illustrated in FIG. 6.

To control movement of the doors 34, a door release mechanism is provided and generally indicated by reference 38. The mechanism 38 is connected to each door 34 by a plate 44 as shown in FIG. 7. Since each door release mechanism 38 is identical, only one will be described herein. Each of the handles 38 is pivotally connected to a plate 44 by pins 46 and includes a handle 40 which extends forwardly from one end of the cart 16 to be engaged by the door opening mechanism 18 when the doors 34 are to be opened. The handle 40 is connected to a latch 42 that extends through the door 34. The latch 42 includes a vertical portion 48 that terminates in a hook 50 at its lower end for engagement with a latch plate 52. The latch plate 52 is bolted to a bracket 54 secured to the end wall 30 of the cart 16. The latch 42 is biased to the latched position relative to the latch plate 52 by a spring 56 acting between the vertical portion 48 and the plate 44. Thus, with the latch 42 in the latched position as shown in FIG. 7, vertical movement of the door 34 is prevented by engagement of the hook 50 with the plate 52. To release the latch, the latch 42 is rotated about the pins 46 against the bias of the spring 56 so that the hook 50 clears the latch plate 52. Vertical movement of door 34 may then occur. The release of the latch and movement of the doors 34 is induced by the door operating mechanism 18 as will now be described.

Referring now to the door opening mechanism 18 as best illustrated in FIGS. 1, 5, 6 and 7, the mechanism comprises a support frame 60 which straddles the track 12 with sufficient clearance to allow the cart 16 to pass through. The frame 60 supports upper and lower pairs of gears 62 and 64 respectively, the gears of each pair being located on opposite sides of the track 12 and rotatable about a horizontal axis. The upper gears 62 are interconnected via a shaft 66 which extends at one end through the support frame 60. A motor 68 is coupled to the one end of the shaft 66 and imparts rotation thereto via a gear box 69 thereby rotating the upper gears 62. Endless loops of chains 70,72 couple the upper and lower gears 62,64 on each side of the track 12 to cause the lower gears 64 to rotate with the upper gears 62 when the motor 68 is actuated. A horizontal crossbar 74 extends between the chains 70,72 and thus, moves with the chains when the motor 68 is actuated to describe a vertical reciprocating motion along horizontally spaced runs.

The mechanism 18 is positioned at the unloading station so that the crossbar 74 engages the handles 40 of a cart 16 at the unloading station as it moves vertically upward under the influence of motor 68. This causes the latches 42 to pivot about the pins 46 against the bias of the springs 56 and move the hooks 50 out of engagement with the latch plates 52. Continued upward movement of the crossbar 74 lifts the doors 34 concurrently upward about the pivots to the position shown in chain dot line in FIG. 5, with the bar 74 at its upper limit whereupon the motor 68 is interrupted. In this position, the platform 26 may be unloaded by the baggage removing device 20.

Figure 2:
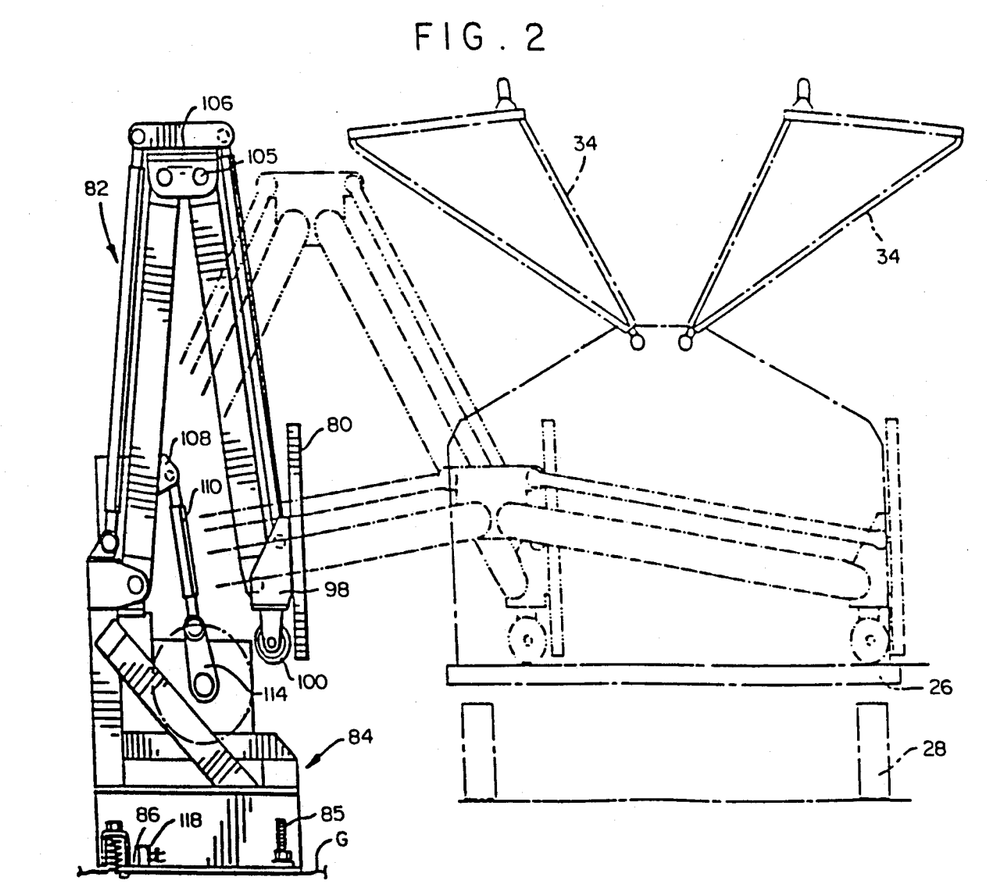
FIG. 2 is a sectional view of the system illustrated in FIG. 1 taken along line 2—2.
Figure 3:
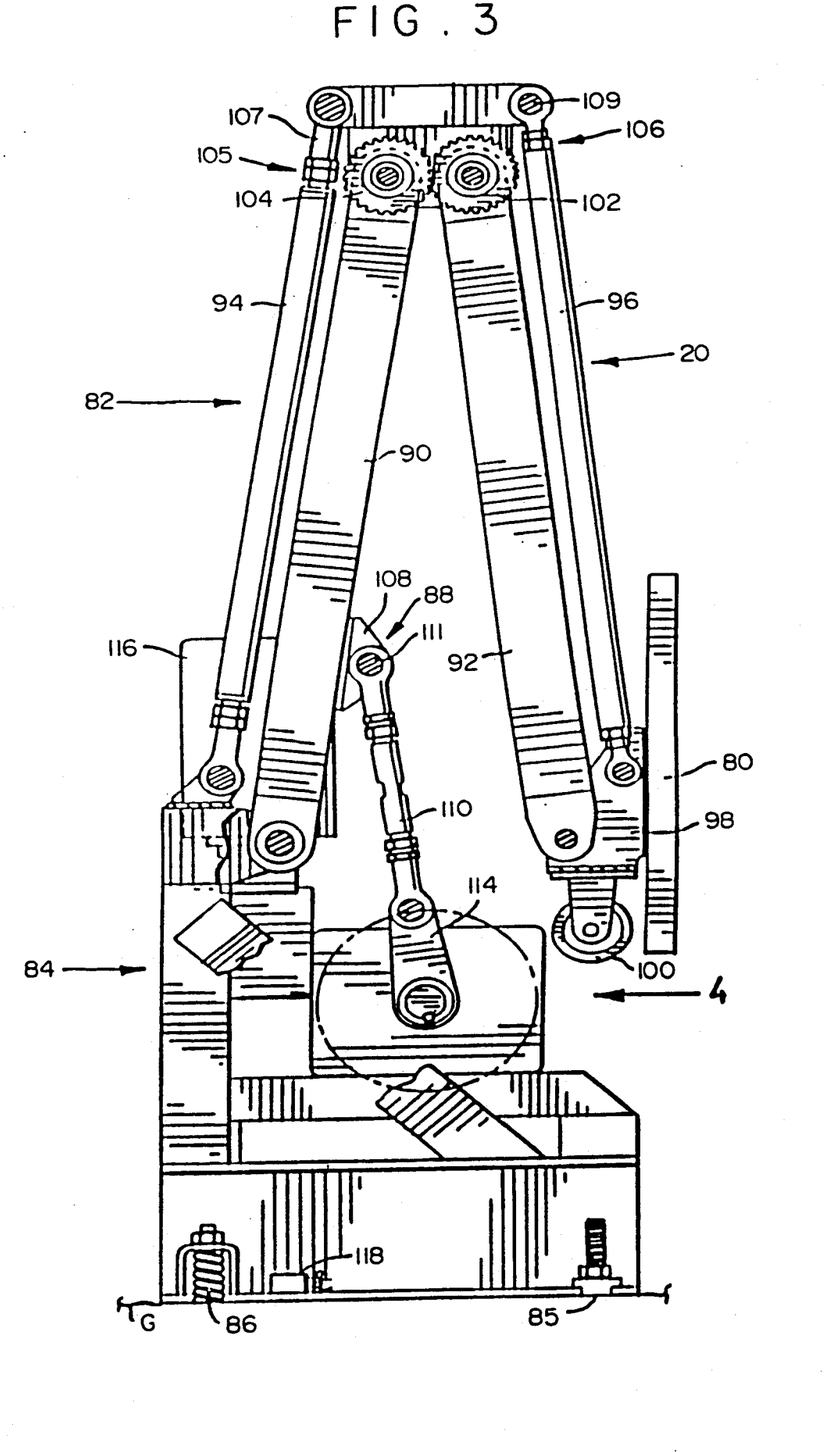
FIG. 3 is a side view of a portion of the system illustrated in FIG. 1.
Figure 4:
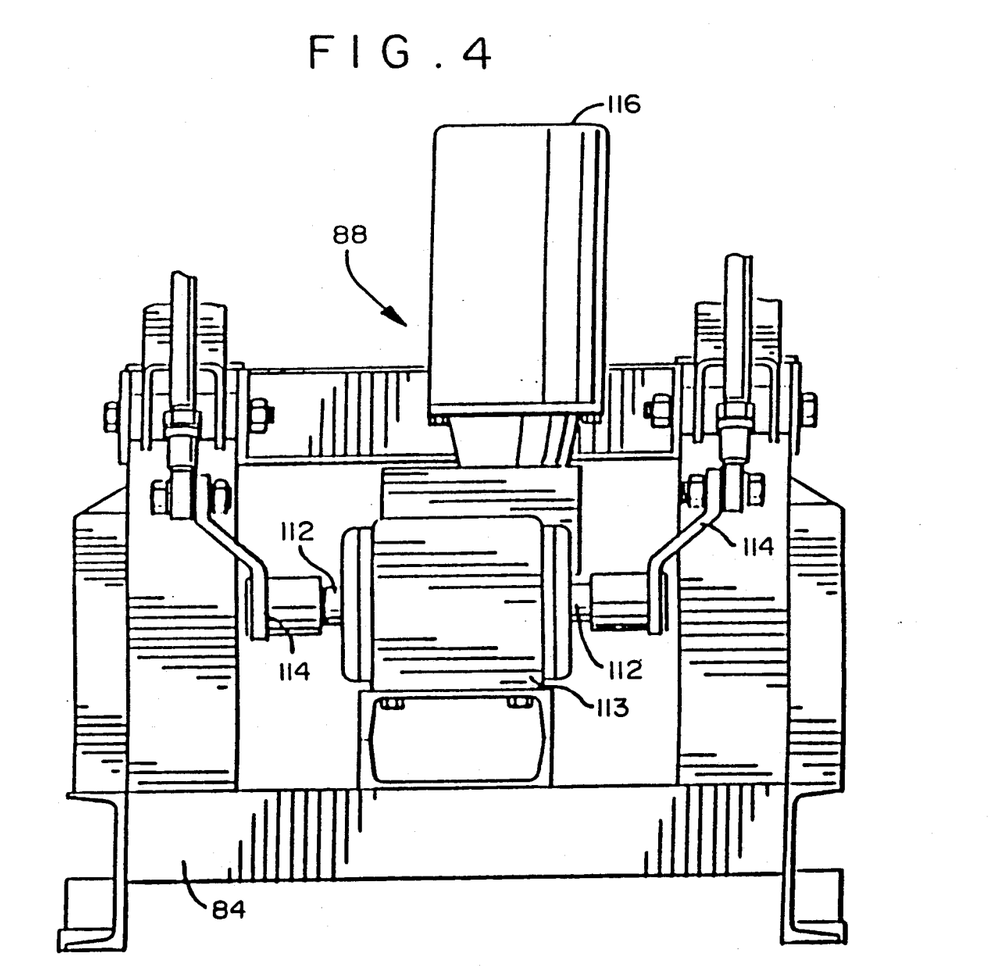
FIG. 4 is a side view of an element of the portion illustrated in FIG. 3.

Referring to FIGS. 2, 3 and 4, the baggage removing device 20 includes a pushing plate 80 secured at either end to respective ones of a pair of arm assemblies 82. The arm assemblies 82 are extendable and retractable to move the plate 80 across the platform 26 to push the baggage off of the cart 16. The other end of the arm assemblies 82 are pivotally connected to a plinth 84. The plinth 84 is resiliently secured to its support surface G by a bolt 85 and spring 86 to elevate the rear of the plinth 84. A drive assembly 88 is provided on the plinth 84 and is coupled to the arms 82 for extending and retracting the arm assemblies 82.

As shown, each arm assembly 82 comprises a pair of booms 90 and 92 and a pair of attitude maintaining links 94 and 96 respectively. The lower end of the boom 92 and link 96 is pivotally connected at vertically spaced locations to a bracket 98 mounted on the plate 80. A wheel 100 is mounted to the bottom of the bracket 98 and rests on the cart platform 26 when the arm assemblies 82 are extended to push baggage from the cart. Inboard ends of the booms 90, 92 are pivotally connected by pins 105 to a housing 106. The housing 106 is provided with lugs 107 to receive pins 109 and to connect pivotally the attitude maintaining links 94, 96 to the housing 106. Gear wheels 104, 102 are mounted on the inboard ends of booms 90, 92 respectively within the housing 106 and mesh to control relative pivotal movement between the booms 90, 92.

The lower ends of boom 90 and link 94 are pivotally connected to the plinth 84 in spaced relation so that a parallelogram linkage is defined between the links 94, boom 90, plinth 84 and housing 106. Similarly, the links 96 and boom 92 define a parallelogram linkage between the housing 106 and the bracket 98.

Movement of the arm assemblies is controlled by the drive assembly 88 that comprises a bracket 108 on each boom 90. Each bracket 108 receives a connecting rod 110 that is pivotally connected thereto via a pin 111. Each connecting rod 110 is connected at its other end to a crank 114 keyed to drive shaft 112 extending in opposite directions from a gear box 113. A motor 116 is coupled to the gear box 113 for rotating the shaft 112. Upon rotation of the drive shaft 112, the cranks 114 rotate and cause, through the connecting rods 110, pivotal movement of the booms 90 about their connection with plinth 84. As the booms pivot, the links 94 maintain the attitude of housing 106 and therefore the pins 105. The rotation of the booms 90 about pins 105 induce an opposite rotation of booms 92 about pins 105 through the interaction of gears 102, 104, causing an outward movement of the lower end of booms 92. The links 96 act to maintain the vertical attitude of the plate 80 during outward movement of the booms 92 with additional vertical support provided by wheels 100. After 180° of rotation of the drive shaft 112, the arm assemblies 82 reach the limit of their travel and continued rotation causes the arms to retract.

A controller 120 is provided to control operation of the baggage removal device 20 and the door opening mechanism 18. The controller 120 monitors the mechanism 18 and prevents the removal device 20 from operating until the doors of the cart 16 have been moved to the open position and the cart 16 is positioned accurately relative to the frame 60. The controller 120 prevents the cart 16 from moving when the arms of the removal device are in an extended position. Furthermore, the controller 120 prevents the cart 16 from being moved within the frame when the crossbar 74 is in a position below the upper surface of the cart.

A microswitch 118 is provided between the lower edge of the plinth 84 and ground G to isolate the motor 116 if a "jam" occurs in the baggage to prevent advance of the pusher plate 80. This condition is sensed by an increased load on the plinth 84 from the arm assemblies 82 causing compression of spring 86. This moves the elevated lower edge of the plinth 84 toward the ground G to open the microswitch 117 and interrupt power to the motor 116.

The unloading sequence will now be described assuming the arm assemblies 82 are retracted as shown in FIG. 1 and the crossbar 74 is elevated as indicated in chain dot line in FIG. 5. The LIM driven cart 16 is moved through the frame 60 until it is properly located relative to the baggage removal device 20 as determined by controller 120. When the cart 16 is in the proper position, the motor 68 is actuated to move the crossbar 74 from the elevated position to a position below the handles 40. This movement occurs on the rearward vertical run of the chains 70, 72 so that the crossbar 74 is clear of the handles 40, as it moves down. Continued rotation of the shaft 66 moves the crossbar 74 forwardly and upwardly to engage the underside of the handles 40 to release the latches and open the doors 34 as described above.

When the doors 34 are in the open position, the motor 68 is stopped so that the crossbar 74 supports the handles 40. The controller 120 detects this condition and allows the motor 116 to be actuated to extend and retract the arm assemblies 82. This causes the plate 80 to sweep the platform 26, thereby forcing the baggage off of the other side of the cart 16 and onto the roller set 22. From the roller set 22, the baggage is conveyed to the conveyor belt 24 where it can be transported at a reduced speed.

When the baggage has been removed from the cart 16 and the arm assemblies 82 of the removal device 20 have been fully retracted, the controller 120 inhibits further operation of the motor 116 and allows the motor 68 to be actuated until the crossbar 74 rotates over the upper gears 62. As this occurs, the crossbar 74 moves away from the cart and is removed from engagement with the underside of the handles 40 thereby allowing the doors 34 to fall closed into locking engagement. With the crossbar 74 positioned above the cart, the controller 120 allows the cart 16 to be driven through the support frame 60 so that the next cart can be unloaded in a similar manner.

It should be apparent that the cart need not be LIM driven but may be powered by other sources. Furthermore, the doors of the cart need not be "gull-wing" shape so long as they do not impede with the movement of the arms of the removal device 20 when lifted to the open position. However, the "gull-wing" doors and the vertical lifting action to open the doors ensures that they cannot accidentally open when moving between loading and unloading stations. The pusher mechanism also provides a robust unit with the drive being in-line with the loads imposed and all disposed to one side of the cart 16.

I claim:

1. A quided freight transportation vehicle comprising a platform, a pair of upstanding end walls located at opposite ends of said platform, a pair of doors located on opposite sides of said platform and extending substantially the entire distance between said end walls, each of said doors including a laterally inwardly extending portion located longitudinally outboard of respective ones of said end walls and pivotally connected thereto to permit pivotal movement of said doors from a first position in which they inhibit removal of freight from said platform to a second position in which they permit removal of freight from said platform, each of said doors being movable upwardly relative to said platform and each having latch means operable to maintain said doors in said first position, said latch means being located adjacent one of said end walls and including a release member carried by and projecting laterally beyond each of said doors in said first position so as to be engageable by a vertically moveable operating member positioned adjacent said one end wall, said release member being movable upwardly relative to said platform by said operating member to release said door from said first position, abutment means being provided to limit relative movement between said door and release member whereby continued upward movement of said release member causes said door to move from said first to said second position.

2. A vehicle according to claim 1 wherein said doors are pivotally connected to said end walls through pivotal connections located to cause lateral movement between said platform and said door upon movement from said first position to said second position.

3. A vehicle according to claim 2 wherein said pivotal connections are laterally outward of the centre of gravity of respective ones of said doors upon continued movement of said doors beyond said second position.

4. A vehicle according to claim 3 including counterbalancing means to permit controlled movement of said doors from said second position to said first position.

5. A vehicle according to claim 4 wherein said counterbalancing means are air springs.

6. A vehicle according to claim 1 wherein said release member is pivotal about an axis parallel to the longitudinal axis of the vehicle to release said latch means.

7. A vehicle according to claim 6 wherein said release member is biased to a position in which said latch means hold said doors in said first position.

* * * * *